United States Patent
Brackett

Patent Number: 5,176,114
Date of Patent: Jan. 5, 1993

[54] ENGINE INTAKE MANIFOLD TUNING BY ACTIVE NOISE CONTROL

[75] Inventor: Stephen E. Brackett, Blenheim, Canada

[73] Assignee: Siemens Automotive Limited, Chatham, Canada

[21] Appl. No.: 871,176

[22] Filed: Apr. 20, 1992

[51] Int. Cl.⁵ .............................................. F02M 35/10
[52] U.S. Cl. .............................. 123/52 M; 181/206; 381/71
[58] Field of Search ......... 123/52 M, 52 MB, 52 MV, 123/52 MC; 181/206; 381/71

[56] References Cited

U.S. PATENT DOCUMENTS

| | | | |
|---|---|---|---|
| 4,805,733 | 2/1989 | Kato et al. | 181/206 |
| 4,889,081 | 12/1989 | Ozaki | 123/52 M |
| 4,934,343 | 6/1990 | Lee | 123/52 M |
| 5,048,470 | 9/1991 | Geddes et al. | 123/52 MB |

Primary Examiner—David A. Okonsky
Attorney, Agent, or Firm—George L. Boller; Russel C. Wells

[57] ABSTRACT

Two speakers are mounted on an engine air induction system to broadcast respective pressure waves into the induction system. One speaker is near the junction of a runner and a plenum. The other is near the outside air intake. Both speakers are driven by electronic circuitry. The one speaker is driven to introduce a pressure wave that reinforces the portion of a pressure wave from an engine cylinder that is reflected back toward the cylinder by the impedance change that exists at the runner/plenum junction, thereby augmenting the charge introduced into the cylinder. The other speaker is driven to cancel the combined pressure waves that travel toward the air intake and is itself sufficiently close to the air intake that the pressure wave that it emits through the air intake has substantially less energy content than would be the case if such cancellation were not conducted.

5 Claims, 3 Drawing Sheets

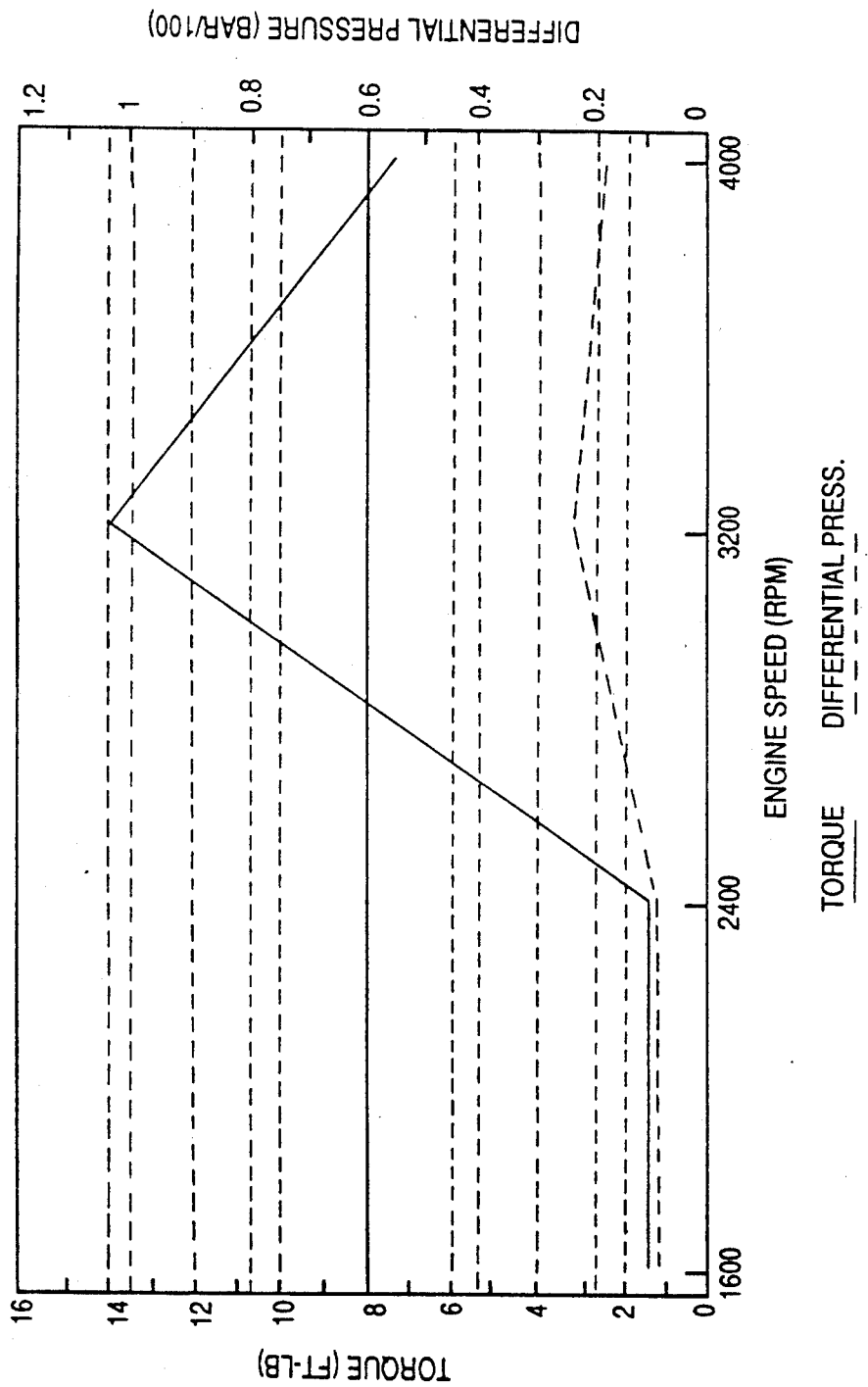

ENGINE INTAKE MANIFOLD TUNING BY ACTIVE NOISE CONTROL

FIELD OF THE INVENTION

This invention relates to air induction systems of internal combustion engines, particularly to improvements for tuning the air induction system.

BACKGROUND AND SUMMARY OF THE INVENTION

From equations that characterize the tuning of an intake manifold, a fixed length runner will provide tuning only at one engine speed. Variable length runner control will result in a limited number of different tuning peaks.

The present invention relates to a new and unique means for obtaining broadband tuning thereby improving upon engine performance curves. The invention utilizes certain known electronics technology relating to active noise control.

U.S. Pat. No. 5,048,470 discloses an electronically tuned intake manifold. In certain respects the present invention may by considered to be an improvement upon that patent.

Briefly, the present invention comprises the use of at least two speakers that broadcast into the air induction system at different locations. The purpose of one speaker is to introduce a pressure wave that reinforces that portion of a pressure wave emanating from an engine cylinder which is reflected back through a runner extending between the cylinder and a plenum.

Further features, advantages, and benefits of the invention will be seen in the ensuing description and claims which should be considered in conjunction with the accompanying drawings. The drawings disclose a presently preferred embodiment of the invention according to the best mode contemplated at this time for carrying out the invention.

BRIEF DESCRIPTION OF THE DRAWINGS

FIG. 4 is a graph plot of representative improvement in engine performance that may be achieved when the present invention is implemented.

DESCRIPTION OF THE PREFERRED EMBODIMENT

Figure 1:
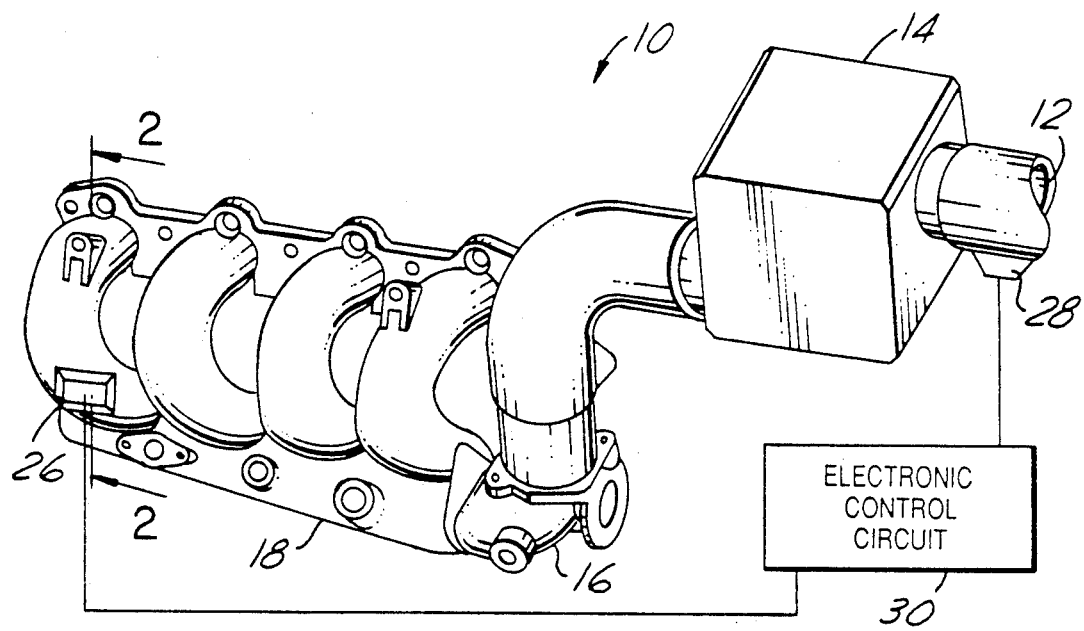
FIG. 1 is a view, partly perspective and partly schematic, of a first embodiment of engine air induction system according to the invention.
Figure 2:
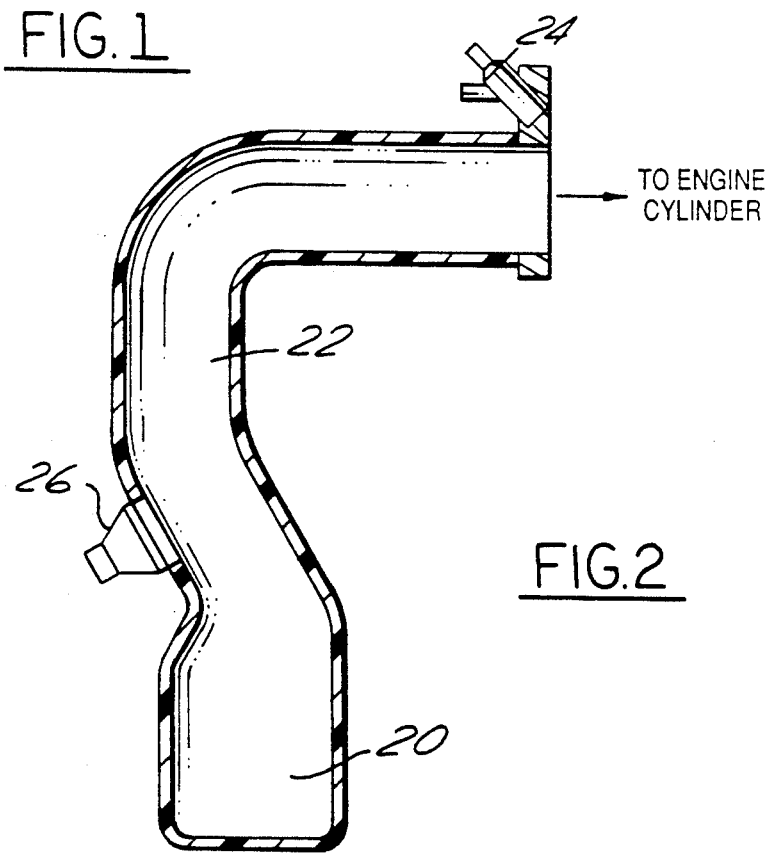
FIG. 2 is an enlarged transverse cross sectional view taken in the direction of arrows 2—2 in FIG. 1.

FIGS. 1 and 2 disclose an engine air induction system 10 comprising, in downstream order, an outside air intake 12, an air filter 14, a throttle body 16, and a manifold 18. Air filter 14 contains an internal filter medium for filtering particulate material from air that is inducted into system 10 via air intake 12 when the engine is being operated. The filtered air passes to throttle body 16 which sets the degree of throttling. From there the air passes to manifold 18.

Manifold 18 comprises a plenum 20 into which the air from throttle body 16 passes. The manifold further comprises a number of runners 22 that extend from plenum 20 to the intakes of individual cylinders of the engine. Each engine cylinder has one or more normally closed intake valves at its intake that are operated open at an appropriate time during an operating cycle to allow flow into the cylinder.

In a multi-point fuel-injected engine, a fuel injector 24 is posed at each cylinder intake and operated to inject fuel into the induction flow entering the cylinder, thereby creating a combustible charge in the cylinder that is subsequently ignited to power the engine.

During a portion of an operating cycle, a reverse pressure wave propagates from the cylinder intake through the runner. When this pressure wave arrives at the junction between the runner and the plenum, a portion is reflected back toward the cylinder intake. This reflection is caused by the impedance change that occurs in the transition from the smaller cross sectional area of the runner to the larger cross sectional area of the plenum. In accordance with certain principles of the invention, this reflected wave is augmented by the introduction of a reinforcing pressure wave via a speaker 26.

Speaker 26 is mounted on manifold 18 at or near the runner/plenum junction. It is mounted on the manifold using known technology, for example such as that disclosed in U.S. Pat. No. 4,665,549.

In accordance with further principles of the invention, another speaker 28 is mounted on the induction system upstream of speaker 26. FIG. 1 shows speaker 28 mounted upstream of air filter 14, closely adjacent air intake 12, An electronic control circuit 30 drives both speakers.

Circuit 30 drives speaker 26 to create a reinforcing pressure wave such that its combination with the reflected pressure wave passing through runner 22 toward the cylinder serves to increase the pressure in the cylinder as the cylinder's intake valve or valves close, thereby yielding improved engine performance. The reinforcing pressure wave that is introduced into the air induction system by speaker 26 however also propagates upstream toward air intake 12, and is additive to the non-reflected portion of the pressure wave from the runner which continues to propagate upstream. FIG. 4 depicts a representative performance improvement that may be attained through implementation of the present invention.

Speaker 28 is driven by circuit 30 to introduce a pressure wave that cancels the combined upstream-propagating pressure waves. While a portion of the pressure wave introduced by speaker 28 will itself propagate upstream toward air intake 12, speaker 28 is disposed sufficiently close to the air intake that the pressure wave emanating from system 10 via the air intake will have substantially less energy content in a defined audible frequency range than would the aforementioned combined upstream-propagating pressure waves if the latter were allowed to propagate to the air intake without cancellation by the pressure wave from speaker 28.

Electronic control circuit 30 is operated in predefined relation to engine operation. One way is by mapping an engine's operation and using a sensor, such as a crankshaft position/speed sensor, to trigger the electronic control circuitry to cause the speakers to deliver suitable pressure waves. Another way is by using one or more transducers to measure the pressure waves in the induction system, and using the electronic control circuit to create appropriate reinforcing and canceling pressure waves for the respective speakers.

Figure 3:
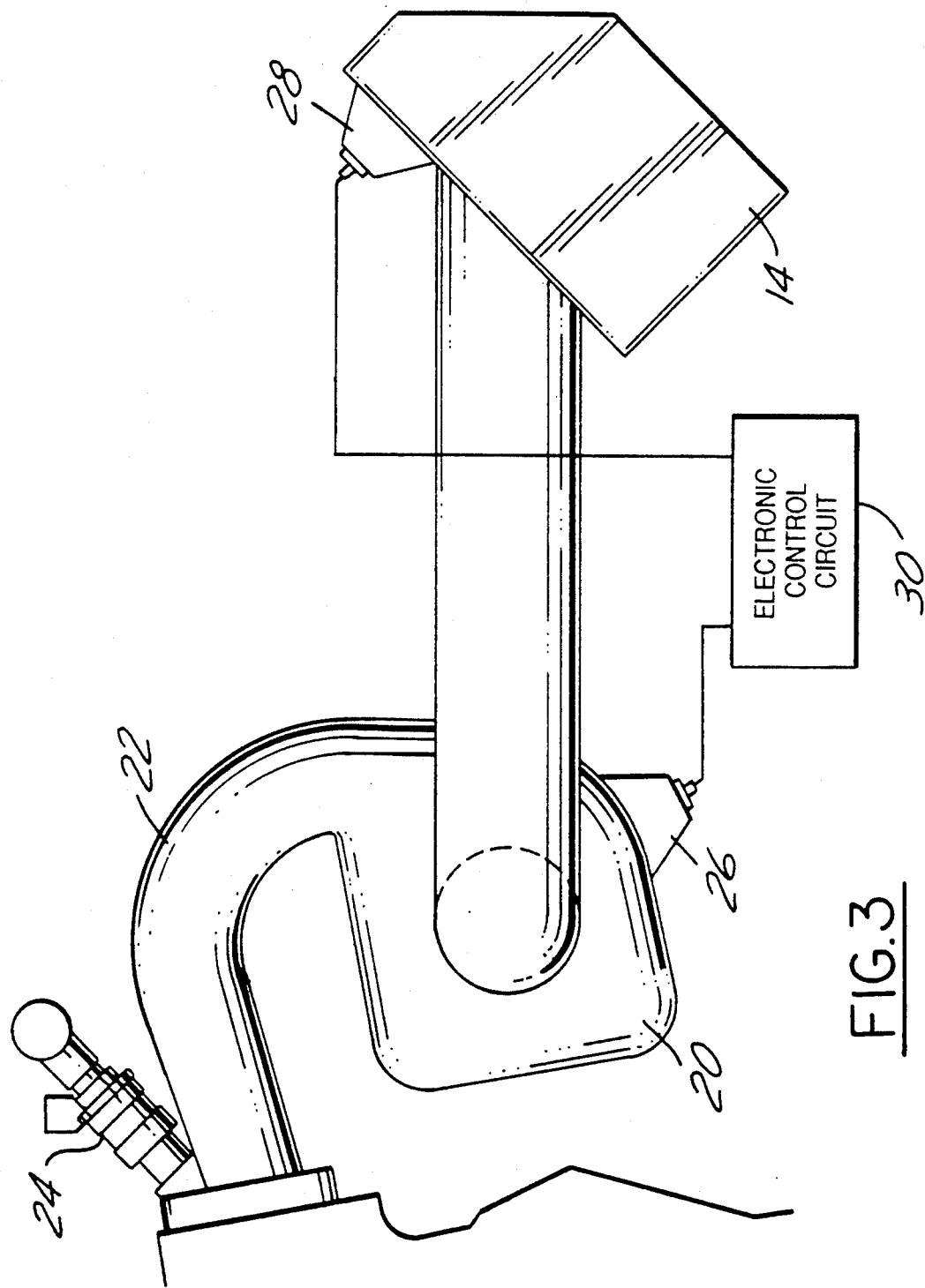
FIG. 3 is view similar to that of FIG. 2, but illustrating another embodiment.

FIG. 3 presents another embodiment wherein like parts are designated by the same reference numerals as used in FIGS. 1 and 2. FIG. 3 differs from FIGS. 1 and 2 in that speaker 26 is disposed on the plenum side of the runner/plenum junction and speaker 28 is disposed on the downstream side of air filter 14. Principles of operation are the same as those described for FIGS. 1 and 2.

Electronic control circuit 30 may embody technology such as that disclosed in U.S. Pat. Nos. 4,677,676 and 4,677,677 for driving speaker 28. Thus, speaker 28 is operated with active noise cancellation technology. Speaker 26 is operated with similar technology, but with what may be described generally as 180 degree phase reversal from that employed in active noise cancellation technology, because the purpose of speaker 26 is to broadcast a pressure wave that reinforces, rather than cancels, the portion of the pressure wave from the engine cylinder that is reflected back through the runner by the impedance change that exists at the runner/plenum interface.

While a presently preferred embodiment of the invention has been illustrated and described, it should be appreciated that principles are applicable to other embodiments.

What is claimed is:

1. An internal combustion engine comprising combustion chamber space and an air induction system for conveying induction air to said combustion chamber space, said air induction system comprising, in downstream flow order, an outside air intake, a plenum chamber, and one or more runners from said plenum chamber to said combustion chamber space, the junction of each such runner with said plenum chamber exhibiting an impedance change to pressure waves that propagate through said induction air system, characterized in that a first speaker is disposed to broadcast into said air induction system at a location between said air intake and said plenum, a second speaker is disposed to broadcast into said air induction system at a location that is downstream of said first speaker at least as far as said plenum, and both said speakers are selectively energized by electronic circuitry that operates in predefined relation to engine operation wherein that portion of a pressure wave propagating along a runner in the direction away from said combustion space which is reflected by the impedance change at the runner's junction with said plenum back along the runner toward the combustion chamber space is reinforced by a portion of a pressure wave from said second speaker, another portion of said pressure wave from said second speaker and an unreflected portion of the first-mentioned pressure wave which propagate together within said air induction system toward said first speaker are canceled by a portion of a pressure wave from said first speaker, said first speaker being disposed sufficiently close to said outside air intake that a portion of the pressure wave that is introduced into said air induction system from said first speaker and that propagates toward said outside air intake results in the emission of a pressure wave from said outside air intake that has substantially less energy content in a defined audible frequency range than would said another portion of said pressure wave from said second speaker and said unreflected portion of the first-mentioned pressure wave if the latter two pressure waves were allowed to propagate to said outside air intake without cancellation by the pressure wave from said first speaker.

2. An internal combustion engine as set forth in claim 1 characterized further in that said air induction system comprises, between said outside air intake and said plenum a filter means for filtering particulate material from inducted air, and said first speaker is disposed downstream of said filter means.

3. An internal combustion engine as set forth in claim 1 characterized further in that said air induction system comprises, between said outside air intake and said plenum a filter means for filtering particulate material from inducted air, and said first speaker is disposed upstream of said filter means.

4. An internal combustion engine as set forth in claim 1 characterized further in that said second speaker is disposed near the junction of said plenum and runner.

5. An internal combustion engine comprising combustion chamber space and an air induction system for conveying induction air to said combustion chamber space, said air induction system comprising, in downstream flow order, an outside air intake, and a manifold comprising one or more runners leading to said combustion chamber space, the upstream termination of each such runner exhibiting an impedance change to pressure waves that propagate through said induction air system, characterized in that a first speaker is disposed to broadcast into said air induction system at a location between said air intake and said upstream terminations of said runners, a second speaker is disposed to broadcast into said air induction system at a location that is downstream of said first speaker and near said upstream terminations of said runners, and both said speakers are selectively energized by electronic circuitry that operates in predefined relation to engine operation wherein that portion of a pressure wave propagating along a runner in the direction away from said combustion space which is reflected by the impedance change at the runner's junction with said plenum back along the runner toward the combustion chamber space is reinforced by a portion of a pressure wave from said second speaker, another portion of said pressure wave from said second speaker and an unreflected portion of the first-mentioned pressure wave which propagate together within said air induction system toward said first speaker are canceled by a portion of a pressure wave from said first speaker, said first speaker being disposed sufficiently close to said outside air intake that a portion of the pressure wave that is introduced into said air induction system from said first speaker and that propagates toward said outside air intake results in the emission of a pressure wave from said outside air intake that has substantially less energy content in a defined audible frequency range than would said another portion of said pressure wave from said second speaker and said unreflected portion of the first-mentioned pressure wave if the latter two pressure waves were allowed to propagate to said outside air intake without cancellation by the pressure wave from said first speaker.

* * * * *